US008261251B2

(12) United States Patent
Kielstra

(10) Patent No.: US 8,261,251 B2
(45) Date of Patent: *Sep. 4, 2012

(54) MODIFICATION OF ARRAY ACCESS CHECKING IN AIX

(75) Inventor: Allan Henry Kielstra, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 948 days.

This patent is subject to a terminal disclaimer.

(21) Appl. No.: 12/256,054

(22) Filed: Oct. 22, 2008

(65) Prior Publication Data

US 2009/0044040 A1    Feb. 12, 2009

Related U.S. Application Data

(62) Division of application No. 10/832,152, filed on Apr. 26, 2004, now Pat. No. 7,448,029.

(51) Int. Cl.
*G06F 9/45* (2006.01)
(52) U.S. Cl. .......................... 717/152; 717/141; 717/153
(58) Field of Classification Search ........................ None
See application file for complete search history.

(56) References Cited

U.S. PATENT DOCUMENTS

| | | | | |
|---|---|---|---|---|
| 6,014,723 A * | 1/2000 | Tremblay et al. | ................. | 711/1 |
| 6,408,383 B1 * | 6/2002 | Tremblay et al. | ............. | 712/227 |
| 6,578,094 B1 * | 6/2003 | Moudgill | ........................ | 710/57 |
| 7,120,902 B2 * | 10/2006 | Flanagan et al. | ............... | 717/130 |
| 7,260,817 B2 * | 8/2007 | Kawahito et al. | ............. | 717/155 |
| 7,730,322 B2 * | 6/2010 | Johnson et al. | ............... | 713/189 |
| 7,950,005 B2 * | 5/2011 | Kawahito et al. | ............. | 717/126 |
| 2002/0112201 A1 * | 8/2002 | Flanagan et al. | ................. | 714/42 |
| 2002/0133806 A1 * | 9/2002 | Flanagan et al. | ............... | 717/123 |
| 2003/0131284 A1 * | 7/2003 | Flanagan et al. | ................. | 714/38 |
| 2003/0172293 A1 * | 9/2003 | Johnson et al. | ............... | 713/200 |
| 2003/0204839 A1 * | 10/2003 | Kawahito et al. | ............. | 717/130 |
| 2003/0236951 A1 * | 12/2003 | Choi et al. | .................... | 711/150 |
| 2003/0237079 A1 * | 12/2003 | Aggarwal et al. | ............. | 717/158 |
| 2007/0277166 A1 * | 11/2007 | Kawahito et al. | ............. | 717/155 |
| 2009/0199162 A1 * | 8/2009 | Choi et al. | .................... | 717/124 |

* cited by examiner

*Primary Examiner* — Tuan Q Dam
*Assistant Examiner* — Zheng Wei
(74) *Attorney, Agent, or Firm* — Steven M. Greenberg, Esq.; Carey, Rodriguez, Greenberg & O'Keefe

(57) ABSTRACT

An error handling operation for checking of an array access in program code is modified during compilation thereof. A sequentially arranged null checking operation and array bounds checking operation for the array access are located. The array bounds checking operation has a corresponding error handling operation operable for setting an array bounds error. The located sequentially arranged null checking operation is removed. The corresponding error handling operation for the located sequentially arranged array bounds checking operation is modified to perform the removed null checking operation during execution of the program code.

9 Claims, 4 Drawing Sheets

MODIFICATION OF ARRAY ACCESS CHECKING IN AIX

CROSS REFERENCE TO RELATED APPLICATIONS

This application is a Divisional of U.S. application Ser. No. 10/832,152, filed Apr. 26, 2004, issued Nov. 4, 2008 as U.S. Pat. No. 7,448,029, entitled "MODIFICATION OF ARRAY ACCESS CHECKING IN AIX," which is incorporated herein by reference in its entirety.

BACKGROUND OF THE INVENTION

The present invention relates to the field of array element checking prior to access.

During execution of Java program code, when an element in an array is accessed there are two run-time checks that are performed: a check to see if a reference to the array is null (or does not exist) and a check to see if the value of an index delineating the element is greater than the length of the array.

The first of these checks, to see if the reference to the array is null, can be performed on some operating systems by dereferencing a base address of the array. The use of different operating systems on a computing system that is executing the Java command to access the array may produce different results to this dereference. In the case of many operating systems, such as Linux and Windows, the dereferencing of a null reference will cause a hardware exception. However, on AIX (Advanced IBM Unix) such a dereference of a null reference will result in a successful read of the value 0. While it is obvious that the array does not exist when a hardware exception is produced, dereferencing of the reference producing the value 0 would initially provide the perception that the array exists but has no elements in it.

In AIX, both the first and second checks are performed separately. Each check adds to the length of processing time and also to the amount of processing power used when the program code is executed. Since the reference to the array being accessed in not null and the index is within range for most cases, the two separate checks unnecessarily add to processing time and resources used.

SUMMARY OF THE INVENTION

An error handling operation for checking of an array access in program code is modified during compilation thereof. A sequentially arranged null checking operation and array bounds checking operation for the array access are located. The array bounds checking operation has a corresponding error handling operation operable for setting an array bounds error. The located sequentially arranged null checking operation is removed. The corresponding error handling operation for the located sequentially arranged array bounds checking operation is modified to perform the removed null checking operation during execution of the program code.

Other aspects and features of the present invention will become apparent to those ordinarily skilled in the art upon review of the following description of specific embodiments of the invention in conjunction with the accompanying figures.

DETAILED DESCRIPTION OF THE INVENTION

Figure 1:
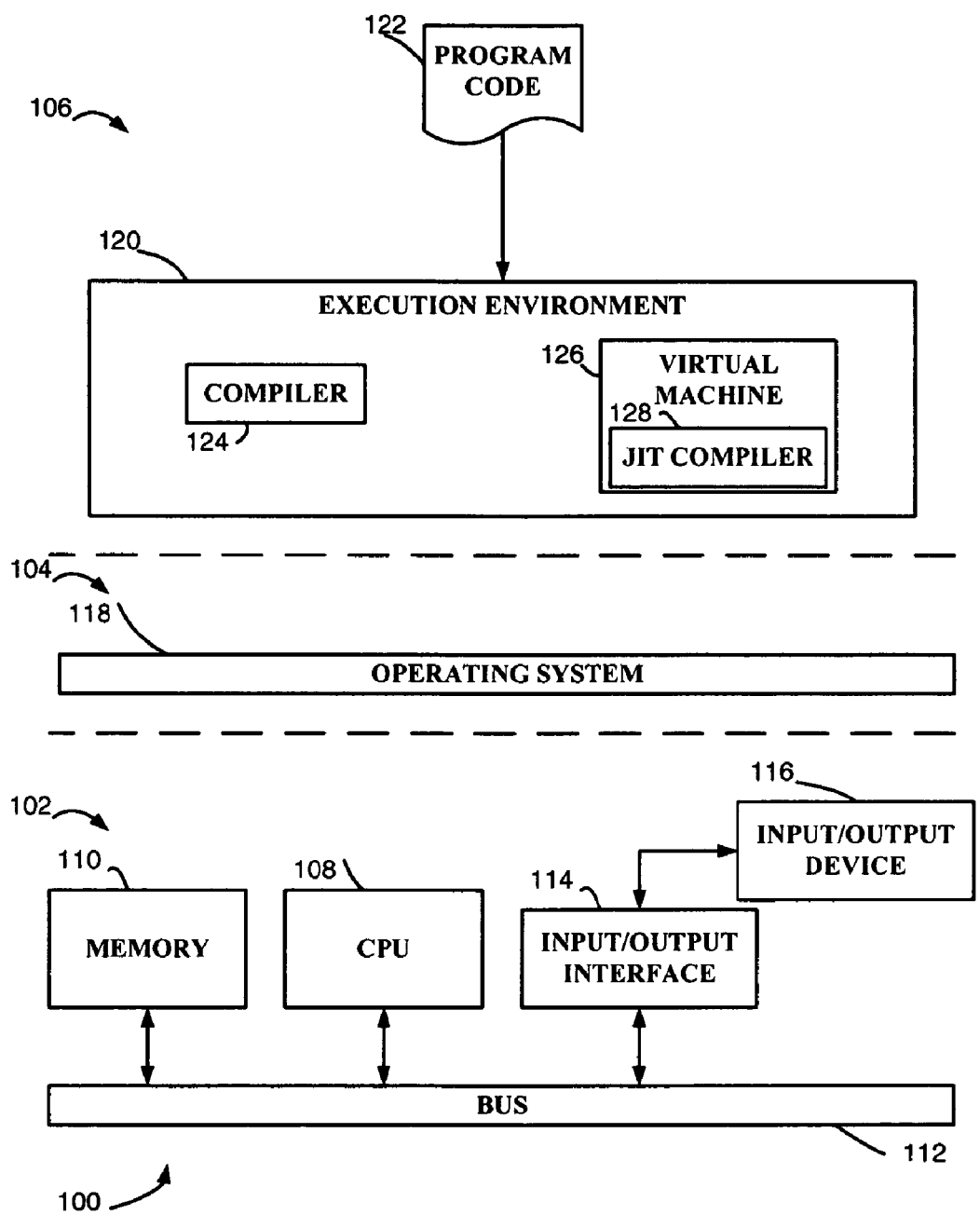
FIG. 1 shows an exemplary computing environment in which the present invention may be implemented.

The present invention will now be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 and the associated description represent an example of a suitable computing environment 100 in which the present invention may be implemented. The computer 100 has different layers of functionality that are built on top of each other to cooperatively operate. A hardware layer 102 includes the hardware resources in the computer 100. The operating system layer 104 runs in conjunction with the hardware layer 102 and interconnects the hardware layer 102 with a software layer 106. The software layer 106 contains the functionality with which a user interacts.

The hardware layer 102 contains the physical components of the computer 100 and includes a central processing unit (CPU) 108, a memory 110, an input/output interface 114 and a bus 112. The CPU 108, the memory 110 and the input/output interface 114 are connected with one another via the bus 112. The input/output interface 114 is configured so that it can be connected to an input/output unit 116.

The CPU 108 can be a commercially available CPU or a customized CPU suitable for operations described herein. Other variations of the CPU 108 can include a plurality of CPUs interconnected to coordinate various operations and functions. The computer 100 serves as an apparatus for performing the present method by the CPU 108 executing the present invention.

The operating system layer 104 includes an operating system 118 that interfaces with the physical components in the hardware layer 102. The operating system 118 may reside in the memory 110, be executed by the CPU 108 and take advantage of the bus 112 to interact with other components in the hardware layer 102. In the present invention the operating system 118 under consideration is AIX (Advanced IBM Unix).

The software layer 106 includes an execution environment 120 that transforms program code 122 supplied by a user into a form that can be executed by the computer 100. The execution environment 120 includes a compiler 124 that accepts the program code 122 and translates it into an intermediate form. If the program code 122 is written in the Java programming language, this intermediate form is bytecode.

A virtual machine 126 in the execution environment 120 includes a just in time (JIT) compiler 128. The virtual machine 126 obtains the intermediate form of the program code 122 and provides it to the JIT compiler 128 to generate machine instructions for execution of the code on the computer 100. During production of the machine code from bytecode, the instructions that involve accessing an element of an array are identified and appropriate checks are inserted into the machine code. These checks include a null check to check the value of a reference to the array (i.e. does the reference exist) and an array bounds check to check the index of the element (i.e. is the index for the element actually in the array).

The virtual machine 126 retains the state of the program code 122 during execution including an indication of all data and class definitions that have been loaded into the execution environment 120.

The present invention is incorporated in the JIT compiler 128 which maybe embodied in a program stored in, for example, the memory 110. Alternatively, the present invention may be recorded on any type of recording medium such as a magnetic disk or an optical disk. The present invention recorded on such a recording medium may be loaded to the memory 110 of the computer 100 via the input/output unit 116 (e.g. a disk drive).

Figure 2:
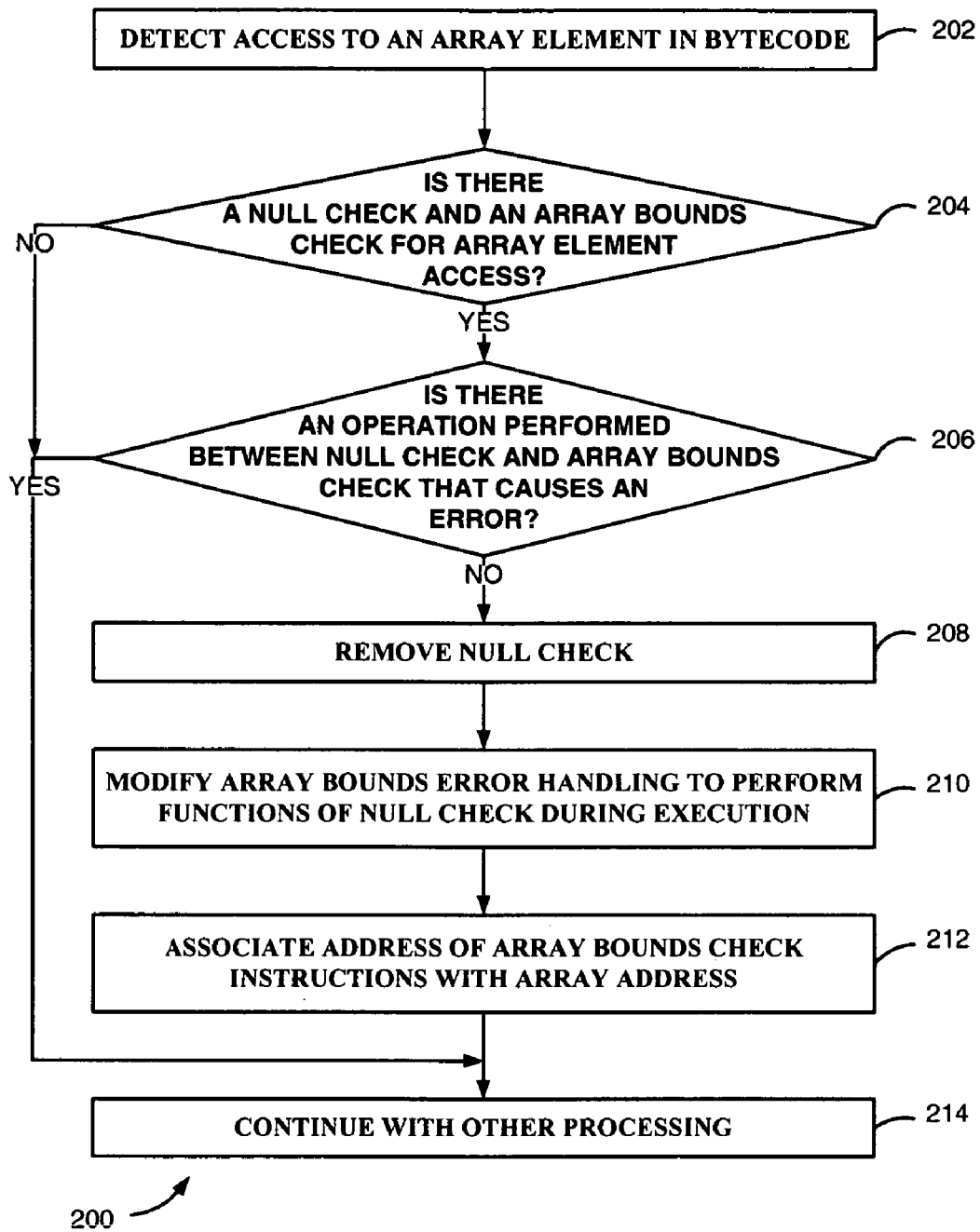
FIG. 2 illustrates a method for modifying a null check and an array bounds check according to an embodiment of the present invention.

FIG. 2 illustrates a method 200 in the JIT compiler 128 of modifying a null check and an array bounds check of an access for an array during compiling. During compiling the JIT compiler 128 detects an instruction that involves accessing an array element in the bytecode in step 202.

The instruction to access the array element is examined to determine if there is a null check and an array bounds check for the array element access associated with the instruction in step 204. Initially, all array access have an associated null check and array bounds check; however, during processing some of these checks may be removed.

If there is a null check and array bounds check for the array element access, as determined in step 204, then step 206 determines whether or not there is an operation performed between the null check and the array bounds check that can cause an error. Such an operation can include other checking operations, for example, a check to determine if the value of a divisor is zero.

If there are multiple checks performed for the array access then the order of each check is pre-determined, such as by the virtual machine 126. During compilation, optimizations occur that involve moving operations. However, if errors occur, they should occur in the original order of the operations. In the case of an array access, the reference to the array happens first and therefore the null check is performed first.

The intervening operations that are considered in step 206 may be any operation that has the potential to cause an error.

If there is no intervening operation between the null check and array bounds check that can cause an error then the null check is removed from the bytecode in step 208. Error handling for the array bounds check is modified in step 210 to add instructions to perform a null check. The error handling for the array bounds check may be modified to include the null check instructions or runtime code supporting the array bounds check may be modified. The null check functions are incorporated into the error handling for the array bounds check such if that the primary consideration (i.e. is the index in the array) fails then the null check is performed. That is, the null check is only performed in the event of an error for the array bounds check. Since any errors that are generated should be issued as if the checks had never been modified, an error for the array bounds check is not immediately issued if the index for the access of the array is outside the bounds of the array. Instead, the null check is performed and a null check error is issued if the check failed. Only after the null check has been successfully performed can an array bounds check error be issued. The modification of the array bounds check error handling in step 210 may also be implemented by creating data that enables the virtual machine 126 to correctly handle any error created by the array bounds check and null check.

The address of the array bounds check instructions is associated with the array address in step 212. Such an association may be provided by using a table that includes the address of the array bounds check instructions and the array address. The association may be realized via a table storing the address of the array bounds check instruction with the array address. For example, the array may be stored in a specific register location in the CPU 108 (e.g. at the array bounds check instruction sequence), thus the array address may be stored in an identified register.

After the array bounds check instructions address is associated with the array address or if there was no null check and array bounds check in the bytecode or if there is an intervening operation that causes an error then other processing in the JIT compiler 128 continues in step 214.

Figure 3:
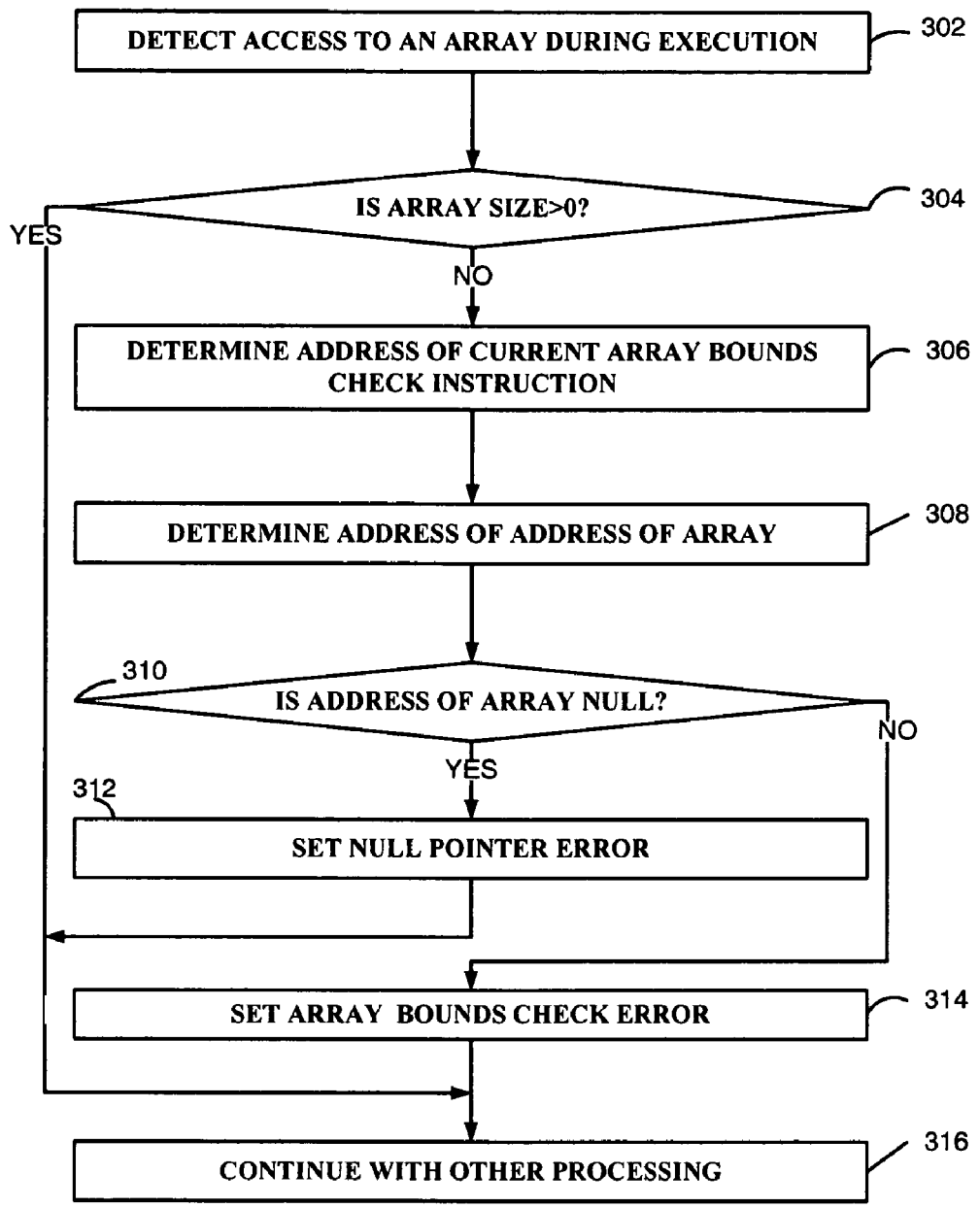
FIG. 3 illustrates a method for performing the modified array bounds check according to an embodiment of the present invention.

FIG. 3 illustrates a method 300 of performing the modified array bounds check with the null check during execution of the bytecode. An instruction involving accessing an array is detected in step 302.

The array size is assessed in step 304. The array size may be stored, for example, in registers in the CPU 108, and accessed for step 304. If the array size is null, as determined in step 304, then the address of the current array bounds check instruction is determined in step 306. The address of the array is determined in step 308. If the address of the array is null, as determined in step 310, then a null reference error is set in step 312. The null address indicates that the array given by the address does not exist. The virtual machine 126 may handle the null reference error according to standard error handling techniques. For example, the virtual machine 126 may halt execution of the program code at the point of the error and resume execution at some other specified point.

If the address of the array is not null, as determined in step 310 then an array bounds error is set in step 314. The virtual machine 126 may handle the array bounds error according to standard error handling techniques.

After the array bounds error has been set or if the element index was greater than null, as determined in step 304, then other processing continues in step 316.

Steps 306-314 handle an error condition for the array bounds check. In an exemplary implementation of the present invention, steps 302, 304 and 316 maybe performed during execution of the program code 122 whereas steps 306-314 may be performed by the virtual machine 126 when an array bounds check fails during execution.

Figure 4:
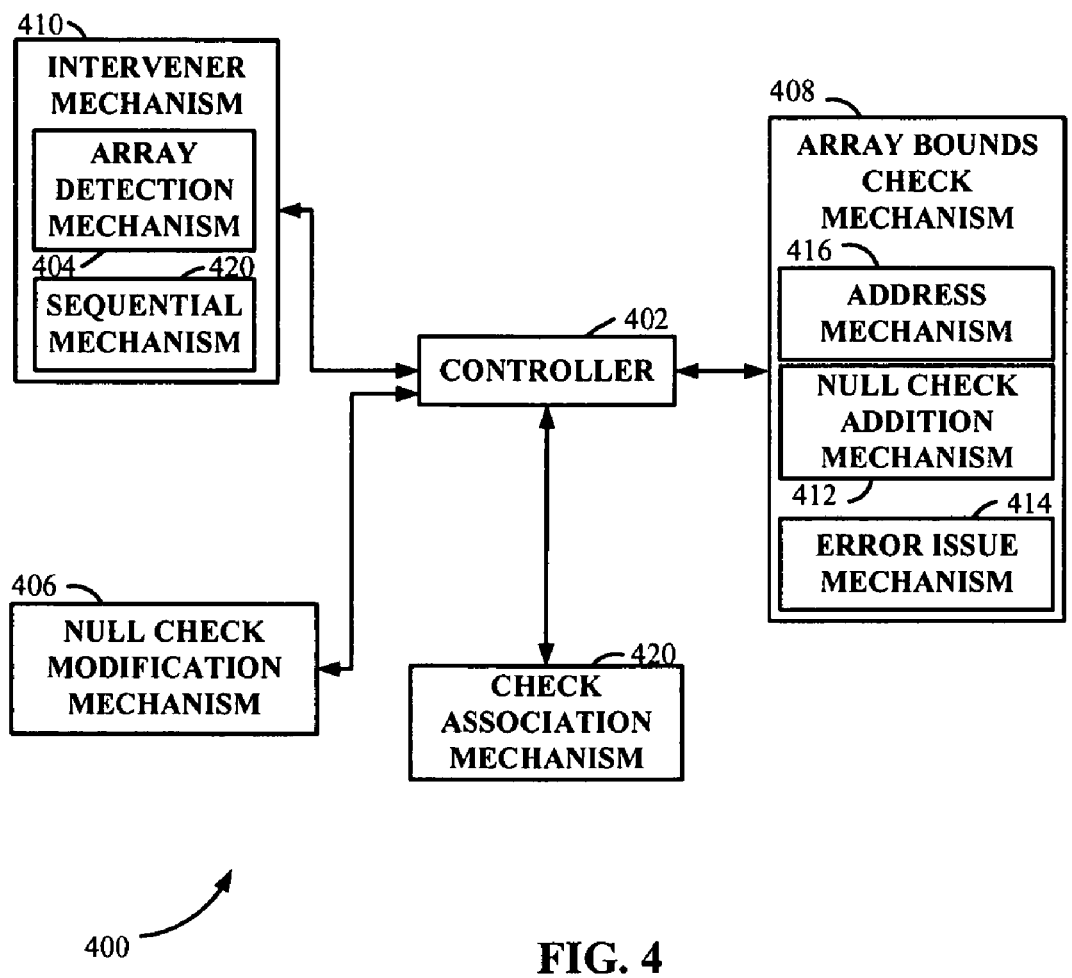
FIG. 4 illustrates a system for modifying the null check and the array bounds check.

FIG. 4 illustrates a system 400 in the JIT compiler 128 for modifying the null check and the array bounds check according to an embodiment of the present invention. The system 400 comprises a controller 402, an array detection mechanism 404, a null check modification mechanism 406, an array bounds check mechanism 408, an intervener mechanism 410 and a check association mechanism 416. The controller 402 coordinates processing by the other components of the system 400 to facilitate the process for modifying and performing the null checks and array bounds checks.

The array detection mechanism 404 detects accessing of an array in the bytecode and produces an indication of such for the controller 402.

The intervener mechanism 410 examines the array access to determine if an operation that can potentially cause an error is to be performed between the null check and an array bounds check. If no such intervening operation exists then the intervener mechanism 410 provides the array access to the null check modification mechanism 406 via the controller 402 where the null check for the array access is removed.

The controller 402 provides the array access to the array bounds check mechanism 408. The array bounds check mechanism 408 comprises an address mechanism 416, a null check addition mechanism 412 and an error issue mechanism 414 all of which collectively function to modify the array bounds check error handling to perform both the array bounds check and the null check functions. The array bounds check mechanism 408 modifies the handling of array bounds check errors. The address mechanism 416 obtains the address of the array and the current array bounds check instructions. The null check addition mechanism 412 adds a null check to the array bounds check to include a determination of whether the array reference is null or has a real value. The error issue mechanism 414 modifies the array bounds check error handling such that if an array bounds check fails then a null check is performed prior to the array bounds check error being issued. Only if the null check passes is the array bounds check error issued, otherwise a null check error issues.

The check association mechanism 420 provides an association between an address of the array bounds check instructions and the array address.

It is apparent to one skilled in the art that numerous modifications and departures from the specific embodiments described herein maybe made without departing from the spirit and scope of the invention.

I claim:

1. A computer hardware system of modifying error handling operations for checking of an array access in program code during compilation thereof, the system comprising:
   an intervener mechanism configured to locate a sequentially arranged null checking operation and array bounds checking operation for the array access;
   a null check modification mechanism configured to remove the located sequentially arranged null checking operation; and
   an array bounds check mechanism configured to modify the corresponding error handling operation to incorporate the removed null checking operation for the located sequentially arranged array bounds checking operation to perform functions of the removed null checking operation during execution of the program code if the bounds checking operation fails prior to setting an array bounds error.

2. The system according to claim 1 wherein the intervener mechanism comprises:
   an array detection mechanism configured to detect a null checking operation and an array bounds checking operation for the array access; and
   a sequential mechanism configured to determine if an intervening operation is arranged between the null checking operation and the array bounds checking operation, determine if the intervening operation can cause an error during execution of the program code and designate the located null checking operation and the array bounds checking operations as sequentially arranged if there is no intervening operation or no error can be caused thereby.

3. The system according to claim 1 wherein the array bounds check mechanism comprises:

a null check addition mechanism configured to incorporate the null checking operation into the corresponding error handling operation prior to setting an array bounds error.

4. The system according to claim 1 wherein the program code is compiled and executed on a computer system based on AIX (Advanced IBM Unix).

5. The system according to claim 1 wherein the array bounds checking operation comprises a corresponding error handling operation operable for setting an array bounds error.

6. The system according to claim 1 wherein the array bounds check mechanism is configured to determine a size of the array, determine whether the array exists, and set a null reference error if the array size is not greater than 0 and the address of the array is null.

7. The system according to claim 6, wherein the array bounds check mechanism is configured to determine whether the array exists by determining an address of the array and to set the null reference error if the address of the array is null.

8. The system according to claim 6, wherein the array bounds check mechanism is configured to determine whether the array exists by determining if the size of the array is null.

9. The system according to claim 6, wherein the array bounds check mechanism is configured to set an array bound error if the array exists.

* * * * *